United States Patent
Hatch et al.

(10) Patent No.: US 6,864,836 B1
(45) Date of Patent: Mar. 8, 2005

(54) METHOD FOR RECEIVER AUTONOMOUS INTEGRITY MONITORING AND FAULT DETECTION AND ELIMINATION

(75) Inventors: Ronald R. Hatch, Wilmington, CA (US); Richard T. Sharpe, Torrance, CA (US); Yunchun Yang, Harbor City, CA (US)

(73) Assignee: Navcom Technology, Inc., Torrance, CA (US)

( * ) Notice: Subject to any disclaimer, the term of this patent is extended or adjusted under 35 U.S.C. 154(b) by 0 days.

(21) Appl. No.: 10/656,956

(22) Filed: Sep. 5, 2003

(51) Int. Cl.[7] .............................. G01S 5/02; H04B 7/185
(52) U.S. Cl. .............................. 342/357.15; 342/357.06
(58) Field of Search ....................... 342/357.06, 357.15, 342/357.12, 352; 702/57, 58, 116, 183; 701/207, 213

(56) References Cited

U.S. PATENT DOCUMENTS

| | | | | |
|---|---|---|---|---|
| 5,412,584 A | * | 5/1995 | Umeno et al. .............. | 702/140 |
| 5,544,308 A | * | 8/1996 | Giordano et al. ............. | 714/26 |
| 5,680,409 A | * | 10/1997 | Qin et al. .................... | 714/799 |
| 5,841,399 A | * | 11/1998 | Yu .......................... | 342/357.02 |
| 5,931,889 A | * | 8/1999 | Misra ........................ | 701/213 |
| 6,114,988 A | * | 9/2000 | Schipper et al. ......... | 342/357.06 |
| 6,204,806 B1 | * | 3/2001 | Hoech .................... | 342/357.02 |
| 6,502,042 B1 | * | 12/2002 | Eid et al. ....................... | 702/50 |
| 6,515,618 B1 | * | 2/2003 | Lupash .................. | 342/357.02 |
| 6,691,066 B1 | * | 2/2004 | Brodie ....................... | 702/185 |
| 2004/0089051 A1 | * | 5/2004 | Camenisch ................. | 73/1.05 |
| 2004/0148940 A1 | * | 8/2004 | Venkateswaran et al. ..... | 60/772 |

OTHER PUBLICATIONS

R. Grover Brown and Paul W. McBurney, "Self-Contained GPS Integrity Check Using Maximum Solution Separation", Navigation: Journal of the Institute of Navigation, vol. 35, No. 1, Spring 1988, pp. 41–53.

Kuusniemi et al., "Fault Detection in Personal Positioning with GPS RAIM", http://www.cs.tut.fi/~sandstro/GNSS2002_Kuusniemi.pdf., last visited Aug. 13, 2003, pp. 1–7.

Maurer et al., "Advanced Receiver Technology for Existing and Future Satellite Navigation Systems", International Journal of Satellite Communications, vol. 18, 2000, pp. 347–364.

P.B. Ober, "Raim Performance: How Algorithms Differ", http://wwwtvs.et.tudelft.nl/people/bas/iongps98.pdf., last visited Aug. 13, 2003, pp. 1–10.

Bradford W. Parkinson and Penina Axelrad, "Autonornous GPS Integrity Monitoring Using the Pseudorange Residual", Navigation: Journal of the Institute of Navigation, vol. 35, No. 2, Summer 1988, pp. 255–274.

* cited by examiner

*Primary Examiner*—Dao Phan
(74) *Attorney, Agent, or Firm*—Morgan, Lewis & Bockius LLP (57) ABSTRACT

A method for detecting and identifying a faulty measurement among a plurality of GPS measurements, obtained by a GPS receiver with respect to a plurality of satellites in view of the GPS receiver, determines whether the plurality of GPS measurements include a faulty measurement. In response to a determination that the plurality of GPS measurements include a faulty measurement, the method identifies a satellite contributing the faulty measurement by computing a correlation value associated with each of the plurality of satellites, and selecting a satellite associated with a highest correlation value as the satellite contributing the faulty measurement.

47 Claims, 7 Drawing Sheets

FIGURE 6

METHOD FOR RECEIVER AUTONOMOUS INTEGRITY MONITORING AND FAULT DETECTION AND ELIMINATION

FIELD OF THE INVENTION

The present invention relates generally to Fault Detection and Elimination (FDE) in a discrete-time controlled process, and particularly to methods for Receiver Autonomous Integrity Monitoring (RAIM) in global positioning systems (GPS).

BACKGROUND OF THE INVENTION

GPS uses satellites in space to locate objects on earth. With GPS, signals from the satellites arrive at a GPS receiver and are used to determine the position of the GPS receiver. Currently, two types of GPS measurements corresponding to each correlator channel with a locked GPS satellite signal are available for civilian GPS receivers. The two types of GPS measurements are pseudorange, and integrated carrier phase for two carrier signals, L1 and L2, with frequencies of 1.5754 GHz and 1.2276 GHz, or wavelengths of 0.1903 m and 0.2442 m, respectively. The pseudorange measurement (or code measurement) is a basic GPS observable that all types of GPS receivers can make. It utilizes the C/A or P codes modulated onto the carrier signals. The measurement records the apparent time taken for the relevant code to travel from the satellite to the receiver, i.e., the time the signal arrives at the receiver according to the receiver clock minus the time the signal left the satellite according to the satellite clock. The carrier phase measurement is obtained by integrating a reconstructed carrier of the signal as it arrives at the receiver. Thus, the carrier phase measurement is also a measure of a transit time difference as determined by the time the signal left the satellite according to the satellite clock and the time it arrives at the receiver according to the receiver clock. However, because an initial number of whole cycles in transit between the satellite and the receiver when the receiver starts tracking the carrier phase of the signal is usually not known, the transit time difference may be in error by multiple carrier cycles, i.e., there is a whole-cycle ambiguity in the carrier phase measurement.

With the GPS measurements available, the range or distance between a GPS receiver and each of a multitude of satellites is calculated by multiplying a signal's travel time by the speed of light. These ranges are usually referred to as pseudoranges (false ranges) because the receiver clock generally has a significant time error which causes a common bias in the measured range. This common bias from receiver clock error is solved for along with the position coordinates of the receiver as part of the normal navigation computation. Various other factors can also lead to errors or noise in the calculated range, including ephemeris error, satellite clock timing error, atmospheric effects, receiver noise and multi-path error. With standalone GPS navigation, where a user with a GPS receiver obtains code and/or carrier-phase ranges with respect to a plurality of satellites in view, without consulting with any reference station, the user is very limited in ways to reduce the errors or noises in the ranges.

To eliminate or reduce these errors, differential operations are typically used in GPS applications. Differential GPS (DGPS) operations typically involve a base reference GPS receiver, a user GPS receiver, and a communication mechanism between the user and reference receivers. The reference receiver is placed at a known location and the known position is used to generate corrections associated with some or all of the above error factors. The corrections are supplied to the user receiver and the user receiver then uses the corrections to appropriately correct its computed position. The corrections can be in the form of corrections to the reference receiver position determined at the reference site or in the form of corrections to the specific GPS satellite clock and/or orbit. Corrections to the reference receiver position are not as flexible as GPS satellite clock or orbit corrections because, for optimum accuracy, they require that the same satellites be observed by the user receiver and the reference receiver.

The fundamental concept of Differential GPS (DGPS) is to take advantage of the spatial and temporal correlations of the errors inherent in the GPS measurements to cancel the noise factors in the pseudorange and/or carrier phase measurements resulting from these error factors. However, while the GPS satellite clock timing error, which appears as a bias on the pseudorange or carrier phase measurement, is perfectly correlated between the reference receiver and the user receiver, most of the other error factors are either not correlated or the correlation diminishes in wide-area applications, i.e., when the distance between the reference and user receivers becomes large.

To overcome the inaccuracy of the DGPS system in wide-area applications, various wide area DGPS (WADGPS) techniques have been developed. The WADGPS includes a network of multiple reference stations in communication with a computational center or hub. Error corrections are computed at the hub based upon the known locations of the reference stations and the measurements taken by them. The computed error corrections are then transmitted to users via a communication link such as satellite, phone, or radio. By using multiple reference stations, WADGPS provides more accurate estimates of the error corrections.

Thus, a user with a GPS receiver may use different modes of navigation, i.e., standalone GPS, DGPS, WADGPS, carrier-phase DGPS, etc. Whichever of the navigation modes is used, there is always the possibility that the range with respect to a satellite are computed based on a faulty measurement, such as a measurement with respect to a failed satellite. When this range is used in determining the position of the user, an erroneous or wrong position would result. Thus, a faulty measurement can cause serious degradation to the reliability and integrity of the GPS system. Therefore, various integrity monitoring techniques have been developed for fault detection and elimination (FDE) in GPS systems. Receiver autonomous integrity monitoring (RAIM) is the name coined by the FAA for methods of integrity monitoring in GPS using redundant GPS satellite measurements.

The literature on RAIM and FDE procedures is extensive. Most of the procedures in the literature, however, are related to aviation use and attempt to bound the probable error in a position domain. As a result, they generally involve very extensive computations. One of the earliest papers describing a RAIM procedure is a paper by Brown and McBurney, "Self-Contained GPS Integrity Check Using Maximum Solution Separation," Navigation, Vol. 35, No. 1, pp 41–53. In this paper, the authors suggest: (1) obtaining GPS measurements with respect to n satellites in view; (2) for each of the n satellites, solving for the user position based on measurements with respect to the other (n-1) satellites; (3) computing all possible distances between the solutions in the horizontal plane and determining a maximum distance among the possible distances; and (4) using the maximum distance as a test statistic and declaring a failure when the maximum distance exceeds a threshold. Clearly, this technique is very computationally intensive and does not isolate a particular measurement or satellite as being faulty.

Another early paper is by Parkinson and Axelrad, "Autonomous GPS Integrity Monitoring Using the Pseudorange Residual," Navigation, Vol 35, No. 2, pp 255–271. In this paper, the authors suggest an excellent test statistic based upon pseudorange measurement residuals, but when it comes to using the test statistic to isolate a failed satellite, they use a scheme similar to that used by Brown and McBurney, i.e., for each of a plurality of satellites, they compute a test statistic while leaving out the measurement with respect to the satellite. Again, this procedure presents an excessive computational burden.

SUMMARY

A method for detecting and identifying a faulty measurement among a plurality of GPS measurements, obtained by a GPS receiver with respect to a plurality of satellites in view of the GPS receiver, determines whether the plurality of GPS measurements include a faulty measurement. In response to a determination that the plurality of GPS measurements include a faulty measurement, the method identifies a satellite contributing the faulty measurement by computing a correlation value associated with each of the plurality of satellites, and selecting a satellite associated with a highest correlation value as the satellite contributing the faulty measurement. In one embodiment, to insure that the correct satellite is identified, the satellite associated with the highest correlation value is selected when the highest correlation value exceeds a predetermined threshold value and the predetermined threshold value is sufficiently larger than a second highest correlation value. In an alternative embodiment, the satellite associated with the highest correlation value is selected when the difference between the highest correlation value and a second highest correlation value exceeds a predetermined threshold.

In some embodiments, whether the GPS measurements include a faulty measurement is determined by computing test statistic using post-fix residuals corresponding to the plurality of GPS measurements, and comparing test statistic with a threshold residual value, which is chosen based on a navigation mode used by the GPS receiver. If the test statistic exceeds the threshold residual value, a faulty measurement is detected.

In some embodiments, the correlation value associated with a satellite is the absolute value of a correlation coefficient associated with the satellite. The correlation coefficient is computed based on a residual sensitivity matrix corresponding to the plurality of satellites and a residual vector including the post-fix residuals corresponding to the plurality of GPS measurements.

In some embodiments, the size of the error in the faulty GPS measurement is determined based on a residual sensitivity matrix corresponding to the plurality of satellites and the root mean square residual.

DESCRIPTION OF EMBODIMENTS

Figure 1:
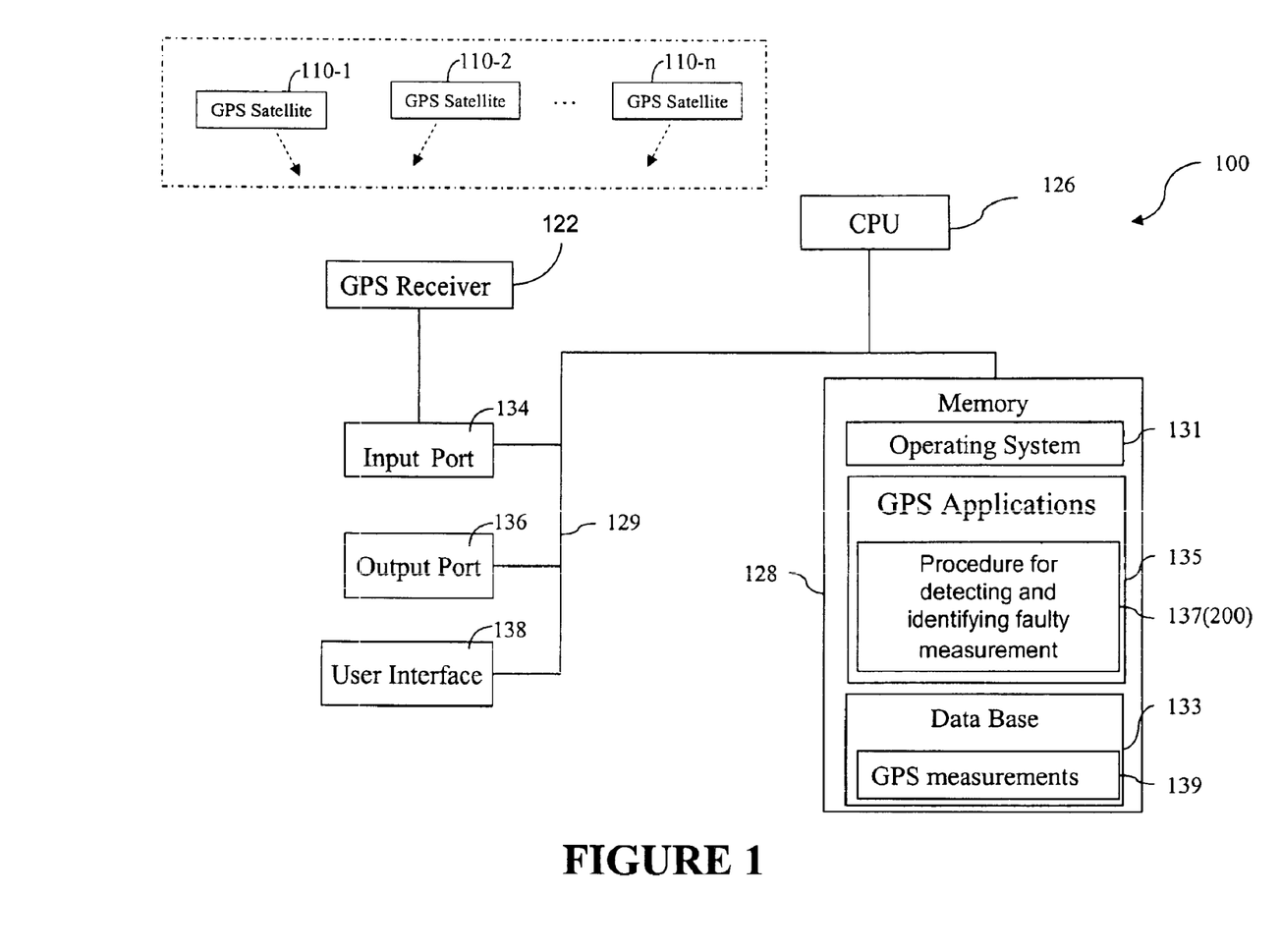
FIG. 1 is a block diagram of a computer system that can be used to carry out a method for detecting and identifying a faulty GPS measurement or a satellite contributing to the faulty GPS measurement.

FIG. 1 illustrates a computer system 100 that can be used to carry out the method for detecting and identifying a faulty GPS measurement among a plurality of GPS measurements. Each of the plurality of GPS measurements is taken by a GPS receiver 122 based on signals from one of a plurality of satellites 110-1, 110-2, . . . , 110-n, where n is the number of satellites in view of the GPS receiver 122. The plurality of satellites, or any one or more of them, are sometimes referred to hereafter in this document as satellite(s) 110. In some embodiments, the GPS receiver 122 and the computer system 100 are integrated into a single device, within a single housing, such as a portable, handheld or even wearable position tracking device, or a vehicle-mounted or otherwise mobile positioning and/or navigation system. In other embodiments, the GPS receiver 122 and the computer system 100 are not integrated into a single device.

As shown in FIG. 1, the computer system 100 includes a central processing unit (CPU) 126, memory 128, an input port 134 and an output port 136, and (optionally) a user interface 138, coupled to each other by one or more communication buses 129. The memory 128 may include high-speed random access memory and may include nonvolatile mass storage, such as one or more magnetic disk storage devices. The memory 128 preferably stores an operating system 131, a database 133, and GPS application procedures 135. The GPS application procedures may include procedures 137 for implementing the method for detecting and identifying the faulty GPS measurement, as described in more detail below. The operating system 131 and application programs and procedures 135 and 137 stored in memory 128 are for execution by the CPU 126 of the computer system 124. The memory 128 preferably also stores data structures used during execution of the GPS application procedures 135 and 137, including GPS pseudorange and/or carrier-phase measurements 139, as well as other data structures discussed in this document.

The input port 134 is for receiving data from the GPS receiver 122, and output port 136 is used for outputting data and/or calculation results. Data and calculation results may also be shown on a display device of the user interface 138.

Figure 2:
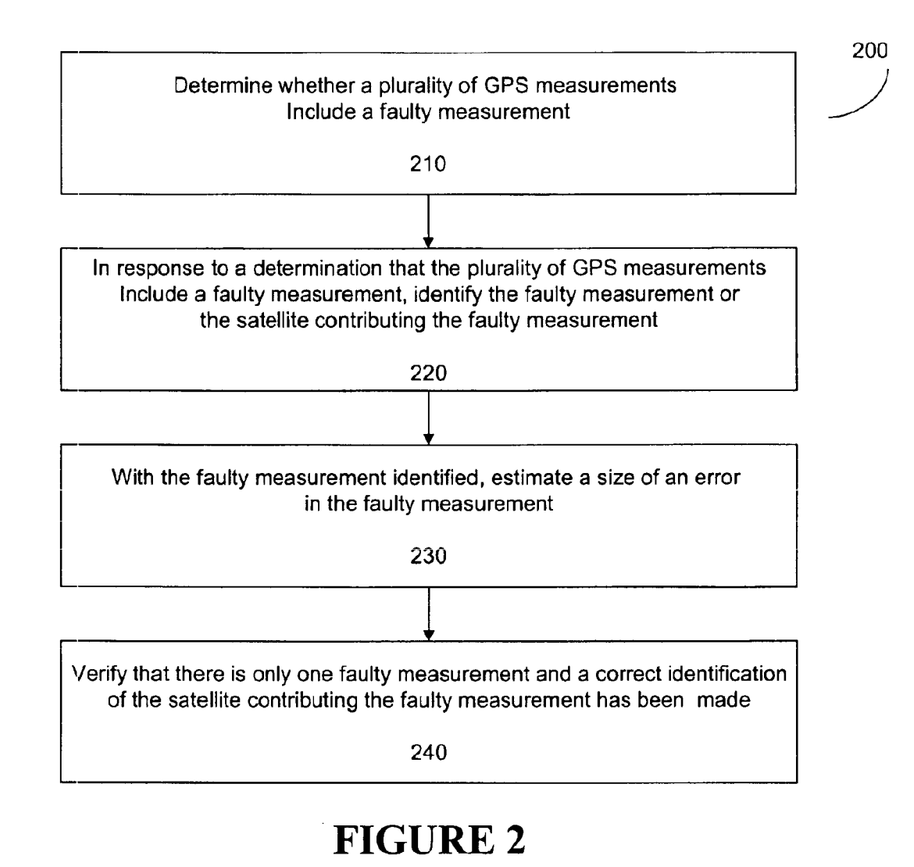
FIG. 2 is a flowchart illustrating the method for detecting and identifying a faulty GPS measurement or a satellite contributing to the faulty GPS measurement.

FIG. 2 illustrates a method 200 for detecting and identifying a faulty GPS measurement among a plurality of GPS measurements obtained by the GPS receiver 122 with respect to the plurality of satellites 110. As shown in FIG. 2, method 200 includes step 210 for determining whether the plurality of GPS measurements include a faulty measurement. In response to a determination in step 210 that the plurality of GPS measurements include a faulty measurement, method 200 further includes step 220 in which the faulty measurement is isolated or identified among the plurality of GPS measurements, or the satellite contributing to the faulty measurement is isolated or identified among the plurality of satellites. With the satellite contributing the fault measurement identified, method 200 may include an optional step 230 in which a size of an error in the faulty measurement is determined, and an optional step 240 for verifying that the correct identification has been made.

Figure 3:
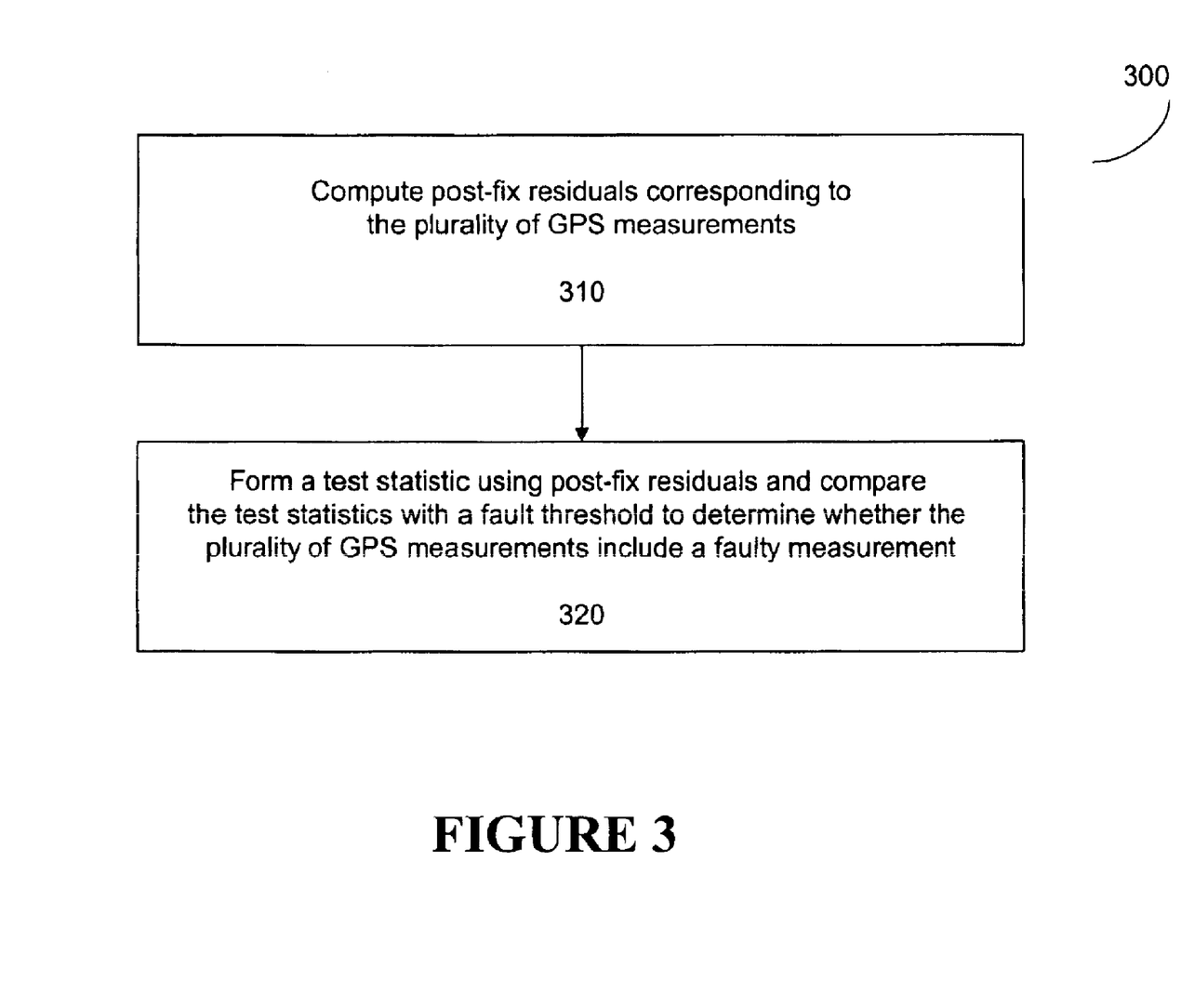
FIG. 3 is a flowchart illustrating a method for determining whether a plurality of GPS measurements include a faulty GPS measurement.

FIG. 3 illustrates an embodiment of a method 300 for determining whether the GPS measurements include a faulty measurement in step 210. As shown in FIG. 3, method 300 includes step 310 in which post-fix residuals corresponding to the plurality of GPS measurements are computed and step 320 in which a test statistics is formed using the post-fix residuals and is compared with a threshold to determine whether the plurality of GPS measurements include a faulty measurement. A residual of a GPS measurement represents a disagreement between the GPS measurement and a prediction or expected value of the GPS measurement. Before the position and clock bias of the GPS receiver are adjusted, the residuals are often referred to as pre-fix residuals or measurement innovations. A measurement innovation can be computed based on the difference between a GPS measurement and a theoretical prediction of the GPS measurement. Alternatively, a measurement innovation corresponding to a GPS measurement can be computed as the difference between the GPS measurement and an expected value of the GPS measurement computed from an initial estimated state of the GPS receiver, as discussed in the following.

Whatever the navigation mode, navigating with GPS involves a discrete-time controlled process that is governed by a linear stochastic difference equation:

$$Hx = z + n \tag{1}$$

where x is a state vector of the discrete-time controlled process and, in the case of GPS, it includes corrections to the position and clock bias of the GPS receiver, H is a measurement sensitivity matrix including direction cosines of the state vector or unit vectors from the GPS receiver to each of the n satellites, z is a measurement innovation vector including measurement innovations corresponding to the plurality of GPS measurements, and n is a measurement noise vector. In the case of carrier-phase measurements, the state vector may include an unknown ambiguity factor.

The post-fix residuals are usually obtained in a two-step process. First, a least-squares solution for x is made, i.e.

$$\hat{x} = (H^T H)^{-1} H^T z \tag{2}$$

or, $$\hat{x} = (H^T R^{-1} H)^{-1} H^T R^{-1} z \tag{3}$$

for a weighted least squares solution. R in Equation (4) is a measurement covariance matrix and $$R = \begin{bmatrix} \sigma_1^2 & \cdots & 0 \\ \vdots & \ddots & \vdots \\ 0 & & \sigma_n^2 \end{bmatrix} \tag{4}$$

where $\sigma_i$, i=1, 2, ..., n, represents a standard deviation of GPS measurement noises with respect to the $i^{th}$ satellite. An example of the methods for calculating $\sigma_i$ can be found in "*Precision, Cross Correlation, and Time Correlation of GPS Phase and Code Observations*," by Peter Bona, GPS Solutions, Vol. 4, No. 2, Fall 2000, p. 3–13, or in "*Tightly Integrated Attitude Determination Methods for Low-Cost Inertial Navigation: Two-Antenna GPS and GPS/Magnetometer*," by Yang, Y., Ph.D. Dissertation, Dept. of Electrical Engineering, University of California, Riverside, Calif. June 2001, both of which are hereby incorporated by reference.

The correction to the state as calculated in Equation (3) or (4) is used to transform the measurement innovations (pre-fix residuals) into a set of post-fix residuals in step 310 of method 300, according to the following equations $$\Delta = Sz \tag{5}$$

where $\Delta$ is a residual vector including as its elements post-fix residuals corresponding to the plurality of GPS measurements, and S is a residual sensitivity matrix:

$$S = (1 = H(H^T H)^{-1} H^T) \tag{5a}$$

or, $$S = (1 = H(H^T R^{-1} H)^{-1} H^T R^{-1}) \tag{5b}$$

S is called the residual sensitivity matrix because it is a matrix whose elements are the residuals corresponding to unit changes in the measurement innovations. This can be explained through the following discussions. Equation (1) can be expanded to include a set of state vectors corresponding to a set of arbitrary measurement innovation vectors:

$$HX = Z \tag{6}$$

where X includes a set of state vectors $x_1, x_2, \ldots, x_n$ corresponding to a set of arbitrary measurement innovation vectors $z_1, z_2, \ldots, z_n$. Now, if we let Z be an identity matrix, we get the state vectors corresponding to a set of measurement innovation vectors each representing a single unit change (e.g., one meter or any arbitrary unit) in the measurement innovation of a different respective one of the plurality of satellites while the measurement innovations of the other satellites are kept unchanged, as shown in the following equation:

$$HX = I \tag{7}$$

The least-squares solution for X is then:

$$\hat{X} = (H^T H)^{-1} H^T \tag{8}$$

For a weighted least-squares solution this becomes:

$$\hat{X} = (H^T R^{-1} H)^{-1} H^T R^{-1} \tag{9}$$

Multiplying equation (8) by H gives a prediction about the measurement innovations of each satellite based on the least-squares solution:

$$H\hat{X} = H(H^T H)^{-1} H^T \tag{10}$$

Subtracting this prediction from the input value of the innovations, i.e., the identity matrix, we obtain a matrix including the residuals of unit changes in the measurement innovations, which is the residual sensitivity matrix S in Equation (5a) or (5b). As shown in Equation (5), the S matrix can be used to directly map the pre-fix residuals (measurement innovations) into the post-fix residuals.

Thus, each column (or row) of the S matrix includes residuals corresponding to a unit change in the measurement innovation of one of the plurality of satellites while the measurement innovations of the other ones of the plurality of satellites are kept unchanged. The S matrix has a number of interesting properties: it is symmetric; it is idempotent, i.e., $S=S^2=S^3= \ldots$; the sum of the elements in any row or column equals zero; and the length of any row or column is equal to the square root of an associated diagonal element. Since the state vector, x, has four elements for most navigation modes, the rank of S is n−4, where n is the number of satellites.

With the S matrix, the post-fix residuals in the residual vector $\Delta$ can be computed according to Equation (5) in step 310. The post-fix residuals can be used to compute a root mean square residual $\delta$, which is the norm value (or length) of a residual vector $\Delta$ divided by the number of measurements, n, i.e., $$\delta = \sqrt{\frac{\Delta^T \Delta}{n}} \quad (11)$$

After computing the post-fix residuals in step 310, method 300 further includes step 320 in which the post-fix residuals or the root mean square residual are used to form a test statistic, which is then compared with a fault threshold to determine whether the plurality of GPS measurements include a faulty measurement. The test statistic can be the root mean square residual. Or, it can be the length of the post-fix residual vector scaled by appropriate normalization for the number of satellites, such as the square root of (n−4), as in the following equation $$\sigma = \sqrt{\frac{\Delta^T \Delta}{(n-4)}} \quad (12)$$

Alternatively, when one is not concerned with very small errors, the fault threshold can be set large enough so that the scaling is relatively insignificant. Thus, the test statistic a can simply be the length of the post-fix residual vector, i.e., $$\sigma = \overline{\Delta^T \Delta} \quad (12a).$$

When the test statistic is larger than the fault threshold, it is determined that the plurality of GPS measurements-include a faulty measurement. Since the level of measurement noise (or the position accuracy) of the GPS receiver 122 often depends on the navigation mode in which the GPS receiver is operating, in some embodiments the fault threshold value is selected to correspond to the navigation mode used by the GPS receiver 122.

Figure 4:
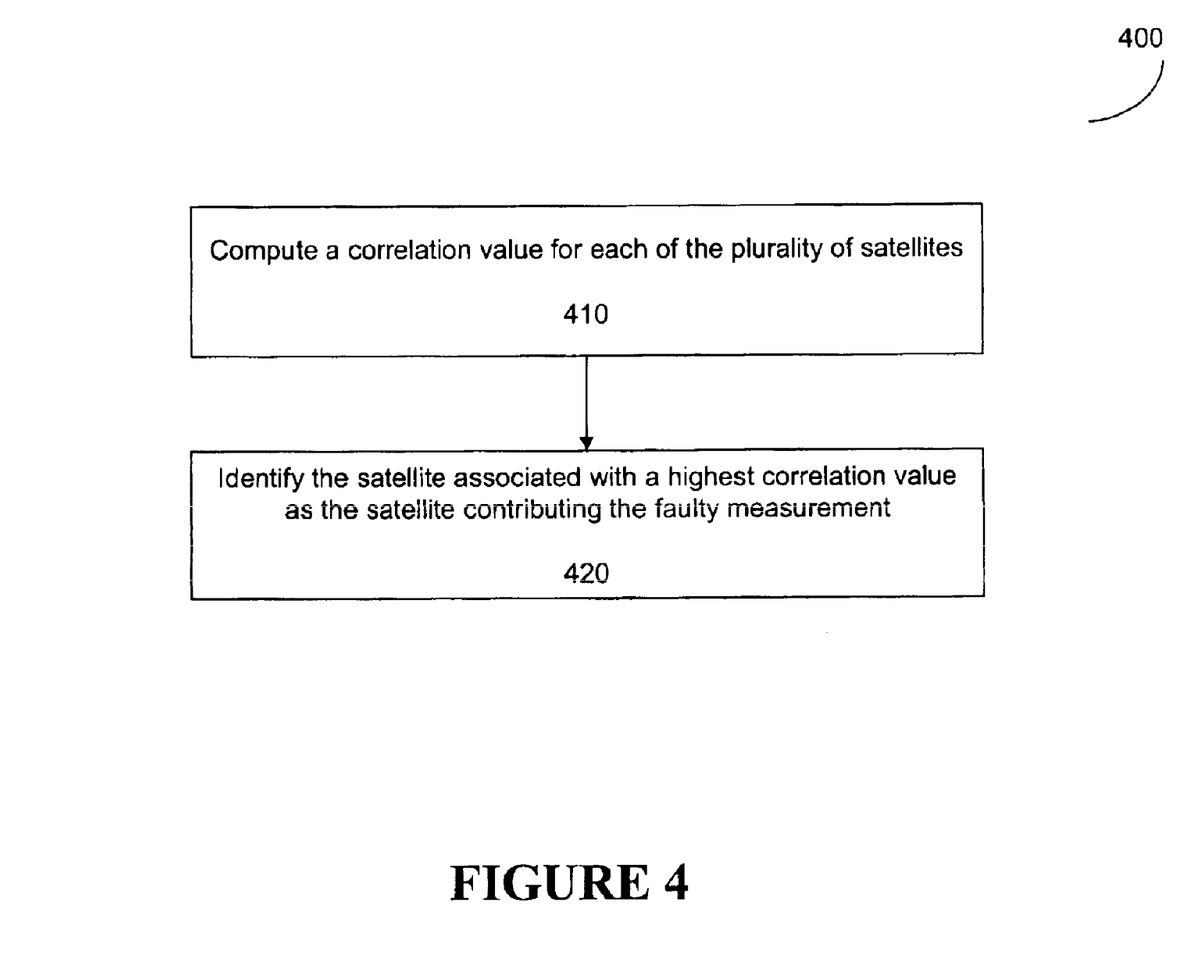
FIG. 4 is a flowchart illustrating a method for identifying a faulty GPS measurement among a plurality of GPS measurements.

FIG. 4 illustrates an embodiment of a method 400 for identifying the faulty measurement or a satellite contributing the faulty measurement in step 220 of method 200. As shown in FIG. 4, method 400 includes step 410 in which a correlation value associated with each of the plurality of measurements or with each of the plurality of satellites is computed, and step 420 in which a satellite associated with a highest correlation value among the plurality of satellites 110 is identified as the satellite contributing the faulty measurement, or the GPS measurement with respect to the satellite associated with the highest correlation value is identified as the faulty measurement.

In some embodiments, the correlation value associated with each one of the plurality of satellites is computed based on a correlation coefficient associated with the satellite or with the one of the plurality of GPS measurements with respect to the satellite. The correlation coefficient associated with a satellite, e.g., the $j^{th}$ satellite, where $j=1, 2, \ldots, n$, represents a correlation between the residuals of the plurality of GPS measurements and the residuals corresponding to a unit change in the measurement innovations with respect to the $j^{th}$ satellite, while the measurement innovations of the other satellites are kept unchanged. Thus, the correlation coefficient associated with the $j^{th}$ satellite can be computed using the S matrix and the residual vector $\Delta$ according to the following equation:

$$\rho^j = \frac{\sum_i \Delta_i \cdot s_i^j}{|\Delta||s^j|} \quad (13)$$

where $\rho^j$ is the correlation coefficient associated with the $j^{th}$ satellite, $\Delta_i$ is the $i^{th}$ element of the residual vector $\Delta$, $s_i^j$ is the element in the $i^{th}$ row and $j^{th}$ column of the S matrix, $|\Delta|$ is the norm value of the residual vector $\Delta$, $s^j$ represents the $j^{th}$ column of the S matrix, and the summation is over all elements of $\Delta$ or of the $j^{th}$ column of the S matrix. Note that the length of $s^j$, $|s^j|$, is equal to the square root of the diagonal element, $s_j^j$.

In one embodiment, the correlation value associated with a satellite is equal to the absolute value of the correlation coefficient associated with the satellite. With the correlation values thus computed, the satellite associated with a highest correlation value among the correlation values associated with the plurality of satellites can generally be identified in step 420 as the satellite contributing to the faulty measurement. However, an additional check may be required to ensure that the correct satellite is identified.

When only five satellites are available, the correlation coefficient associated with every satellite should be about one (or minus one). This is because the degree of freedom is only one (one more satellite than the number of unknowns in the state vector). With only five measurements corresponding to the five satellites, each column in the S matrix is perfectly correlated with the residual vector, except that the length of the columns are different. In other words, the large root mean square residual, which indicated a fault in step 210 of method 200, could be caused by a faulty measurement from any one of the satellites. Moreover, even when the number of satellites is greater than 5, a similar phenomenon can occur with a degenerate geometry. Such a degenerate geometry is indicated if more than one satellite are associated with correlation coefficients close to one or minus one.

Figure 5A:
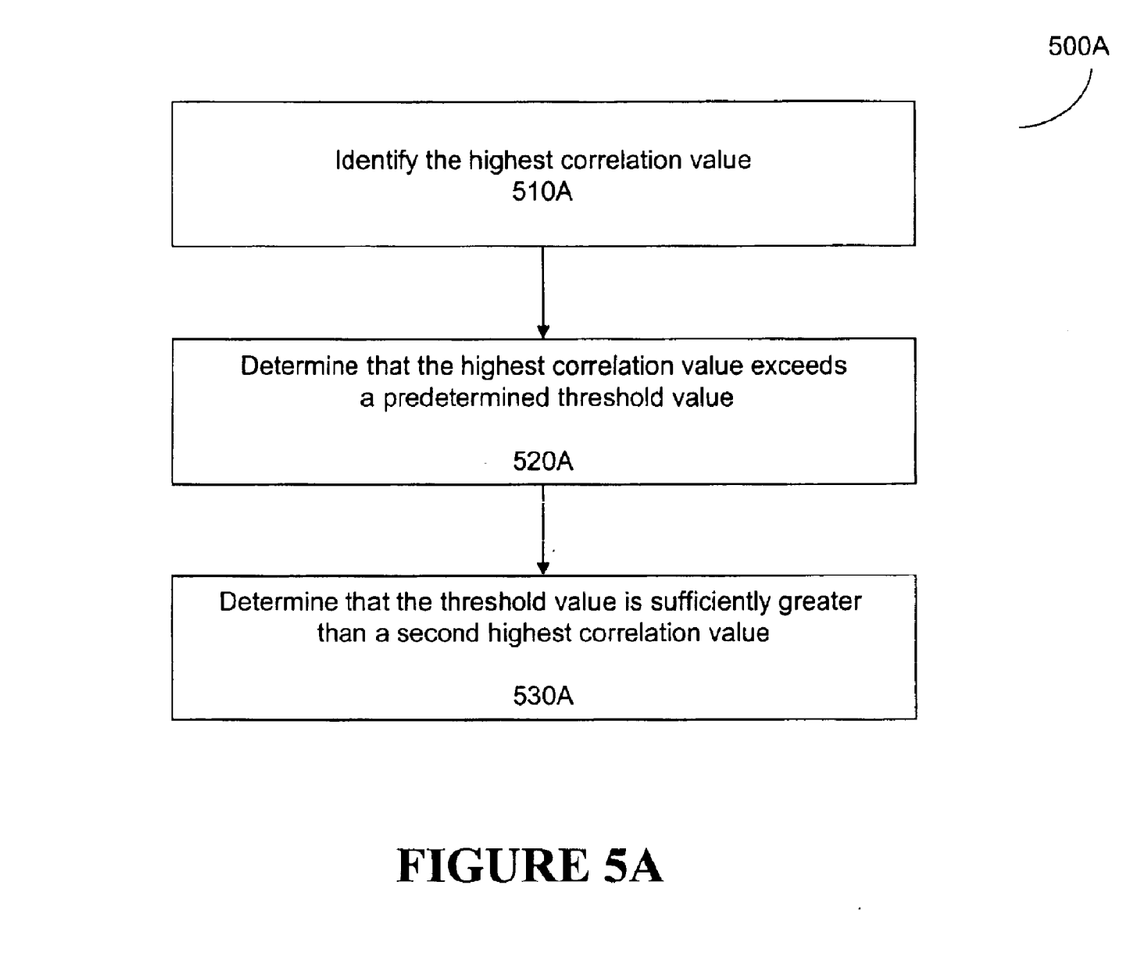
FIG. 5A is a flowchart illustrating a method for identifying a satellite with a highest correlation value as the satellite contributing to the faulty GPS measurement.
Figure 5B:
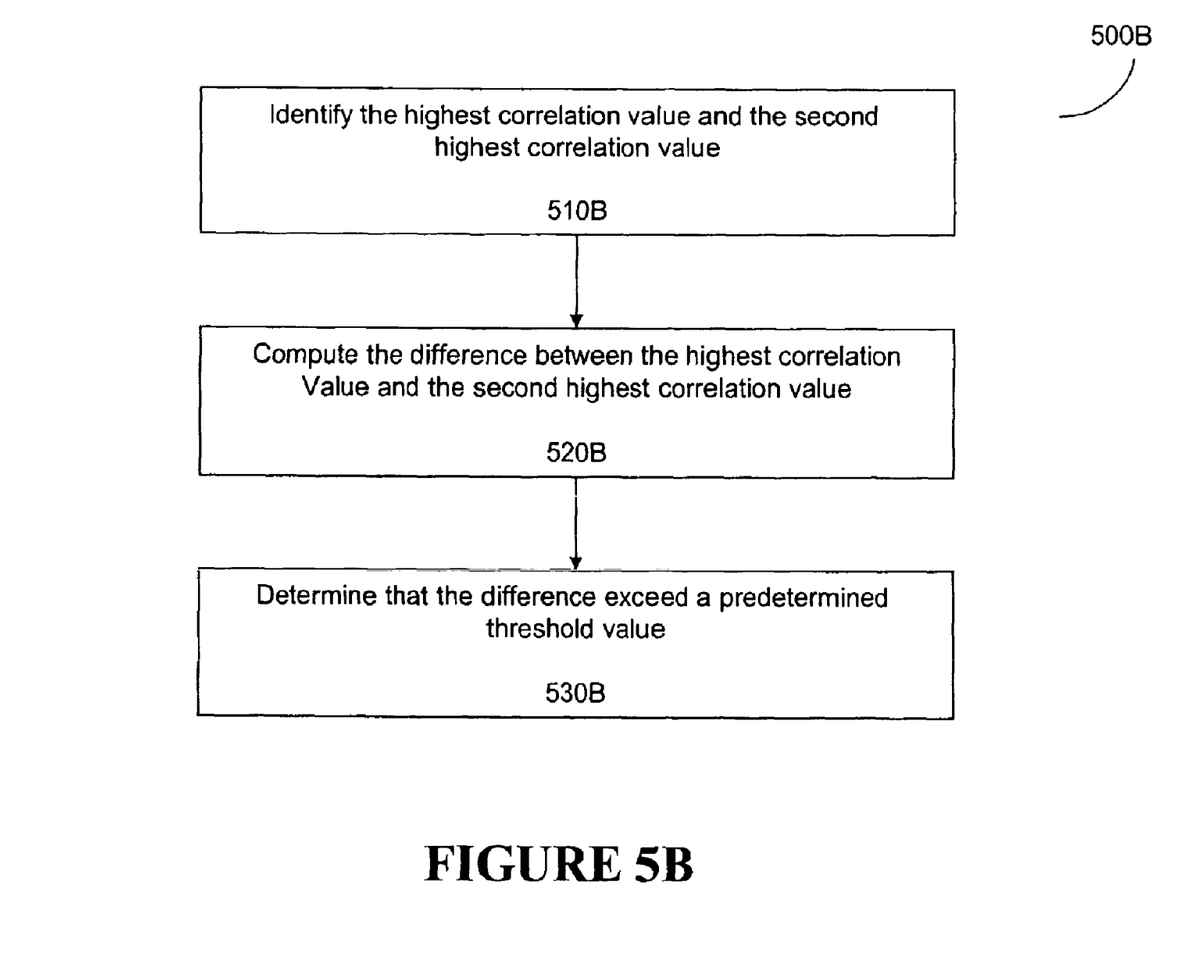
FIG. 5B is a flowchart illustrating another method for identifying a satellite with a highest correlation value as the satellite contributing to the faulty GPS measurement.

Thus, to insure that the satellite contributing to the faulty measurement be identified correctly, method 500A or 500B, as shown in FIG. 5A or 5B, respectively, can be used in step 420. Method 500A includes step 510A in which the highest correlation value is identified among the correlation values associated with the plurality of satellites. Method 500A further includes step 520A for determining that the highest correlation value exceed a predetermined threshold value and step 530A for determining that the predetermined threshold value is sufficiently larger than a second highest correlation value among the correlation values associated with the plurality of satellites. Alternatively, method 500B is used, which includes step 510B in which the highest and the second highest correlation values are identified, step 520B in which the difference between the highest and second highest correlation values are computed, and step 530B for determining that the difference exceeds a predetermined minimum difference value.

With the satellite contributing the faulty measurement identified, method 200 may further include step 230 in which the size of any error in the faulty measurement (or the size of the fault) is estimated. Estimating the size of the fault is sometimes useful, especially when method 200 is used to identify a faulty measurement in a Real-Time Kinematic (RTK) navigation mode. Since RTK navigations usually involve carrier phase measurements and thus resolutions of whole-cycle ambiguities, a measurement fault can be the result of a cycle slip in a tracking loop or an improper determination of the whole-cycle ambiguity. When this is the case, the size of the fault will be a multiple of the carrier wavelength. Given that the satellite, such as satellite 110-k, where k is 1, 2, . . . , or n, with the highest correlation value is identified, a best estimate of the size of the error, $e_k$, is given by the root mean square residual divided by the length of the column of the S matrix associated with the satellite 100-j. So, $e_k$ is the root mean square residual corresponding to a unit change in the measurement innovation of satellite-k while the measurement innovations for the rest of the plurality of satellites are kept unchanged. Since the length of the column of the S matrix is equal to the square root of the corresponding diagonal element of the S matrix, we have:

$$e_k = \frac{\delta\sqrt{n}}{\sqrt{s_k^k}} \quad (14)$$

Note that with poor geometry the diagonal element can be small. However, the smaller the diagonal element, the larger the measurement error from the corresponding satellite must be before it can cause the root mean square residual to exceed the detection threshold.

Figure 6:
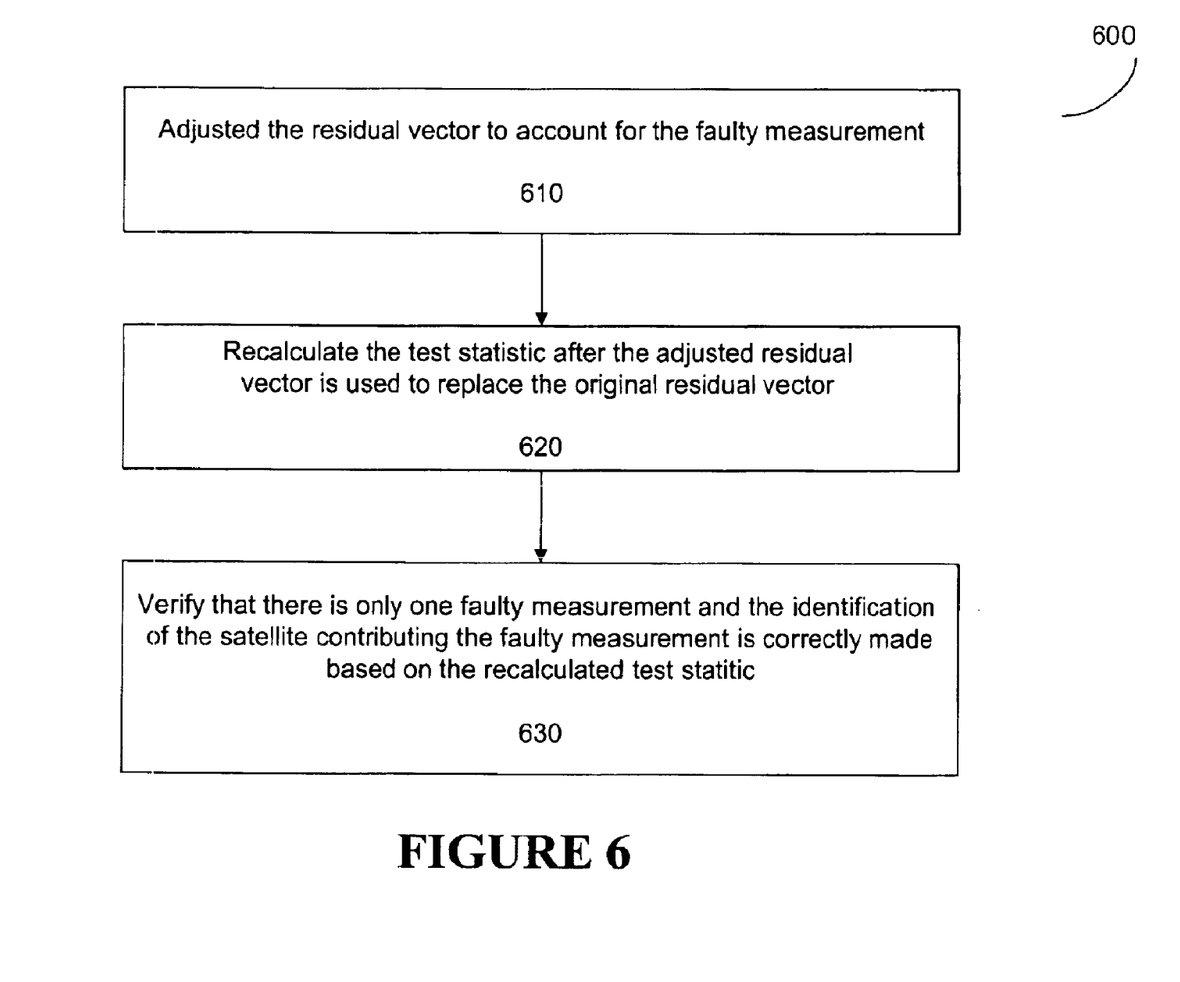
FIG. 6 is a flowchart illustrating a method for verifying that the satellite contributing to the faulty measurement has been identified correctly.

With the size of the error in the faulty measurement estimated, method 200 may further include step 240 for verifying that there is only one faulty measurement among the plurality of GPS measurements and that the identification of the satellite contributing the faulty measurement is correctly made. FIG. 6 illustrates a method 600 for performing the verification in step 240. As shown in FIG. 6, method 600 includes step 610 in which the residual vector Δ is adjusted to account for the error according to the following equation:

$$\Delta' = \Delta + SE \quad (15)$$

where E is a vector with zero elements corresponding to satellites whose measurements are without error and an element having the value of $e_k$ for the satellite 100-k that contributed the faulty measurement. Method 600 further includes step 620 in which the test statistic is recalculated according to Equation (11), (12), or (12a) after the adjusted residual vector Δ' is used to replace the residual vector Δ in the equation. If the fault identification has been made correctly, the recalculated test statistic should now pass the threshold test for the test statistic, indicating that the fault has been removed. Thus, method 600 further includes step 630 in which the recalculated test statistic is compared with the fault threshold to verify that there is only one faulty measurement among the plurality of GPS measurements and the identification of the satellite contributing the faulty measurement is correctly made.

The above described method for identifying a faulty GPS measurement is computationally efficient because it works entirely in the measurement domain. When there are more than five satellites being tracked, the method can be used to dramatically improve the reliability of positioning and navigation using GPS, with only a small cost in additional computational complexity.

We claim:

1. A method for identifying a faulty measurement among a plurality of GPS range measurements that are used to determine a state of a discrete-time controlled process, comprising:

computing a plurality of correlation values, each correlation value associated with one of the plurality of GPS measurements obtained by a GPS receiver with respect to a plurality of satellites, each of the plurality of GPS measurements corresponding to one of the plurality of satellites; and selecting a GPS measurement among the plurality of GPS measurements as the faulty measurement based on the correlation values.

2. The method of claim 1 wherein the correlation values represent a correlation between residuals of the plurality of measurements and residuals corresponding to a change in one of the plurality of measurements while the rest of the plurality of measurements are unchanged.

3. A method for identifying a faulty measurement among a plurality of measurements that are used to determine a state of a discrete-time controlled process, comprising:

computing a plurality of correlation values, each correlation value associated with one of the plurality of measurements; the computing of the correlation values including:

computing a residual sensitivity matrix;

computing residuals corresponding to the plurality of measurements; and computing a correlation coefficient associated with the one of the plurality of measurements based on the residuals of the plurality of measurements and the residual sensitivity matrix; and selecting a measurement among the plurality of measurements as the faulty measurement based on the correlation values.

4. The method of claim 3 wherein computing the residuals corresponding to the plurality of measurements comprises:

obtaining a least-squares solution of the state of the discrete-time controlled process;

computing expected values of the plurality of measurements based on the least-square solution; and computing differences between the plurality of measurements and the expected values of the plurality of measurements.

5. The method of claim 3 wherein the residuals corresponding to the plurality of measurements are computed using the residual sensitivity matrix.

6. The method of claim 1 wherein selecting a measurement among the plurality of measurements as the faulty measurement comprises:

identifying a highest correlation value; and selecting a measurement associated with the highest correlation value as the faulty measurement.

7. The method of claim 6, wherein selecting the measurement associated with the highest correlation value as the faulty measurement comprises:

identifying a second highest correlation value; and selecting the measurement associated with the highest correlation value as the faulty measurement when the difference between the highest correlation value and the second highest correlation value exceeds a predetermined threshold value.

8. The method of claim 6 wherein selecting the measurement associated with the highest correlation value as the faulty measurement comprises:

determining that the highest correlation value exceeds a first predetermined threshold value;

identifying a second highest correlation value; and determining that the second highest correlation value is smaller than the first predetermined threshold value and the difference between the first predetermined threshold value and the second highest correlation value exceeds a second predetermined threshold value.

9. The method of claim 1 wherein the number of the plurality of satellites is greater than 5.

10. The method of claim 1, further comprising:

determining a size of an error in the faulty measurement.

11. The method of claim 10 wherein determining the size of the error in the faulty measurement comprises:

dividing a root mean square residual of the plurality of measurements by a root mean square residual corresponding to a unit change in the one of the plurality of measurements while the rest of the plurality of measurements are unchanged.

12. The method of claim 10 wherein determining the size of the error in the faulty measurement comprises:

dividing a root mean square residual of the plurality of measurements by a square root of a diagonal element corresponding to the faulty measurement in a residual sensitivity matrix.

13. A method for detecting and identifying a faulty measurement among a plurality of GPS measurements obtained by a GPS receiver with respect to a plurality of satellites, comprising:

determining whether the plurality of GPS measurements include a faulty measurement; and in response to a determination that the plurality of GPS measurements include a faulty measurement, identifying a satellite contributing the faulty measurement by:

computing a plurality of correlation values, each correlation value associated with one of the plurality of satellites; and selecting a satellite among the plurality of satellites as the satellite contributing the faulty measurement based on the correlation values.

14. The method of claim 13 wherein determining whether the GPS measurements include a faulty measurement comprises:

computing a test statistic using post-fix residuals corresponding to the plurality of GPS measurements; and determining whether the test statistic exceeds a fault threshold.

15. The method of claim 14 wherein the fault threshold is a function of a navigation mode used by the GPS receiver.

16. The method of claim 14, further comprising:

determining a size of an error in the faulty measurement.

17. The method of claim 16, further comprising:

verifying that the satellite contributing to the faulty measurement has been correctly identified.

18. The method of claim 17, wherein verifying that the satellite contributing to the faulty measurement has been correctly identified comprises:

adjusting the post-fix residuals based on the size of the error in the faulty measurement;

computing the test statistic using the adjusted post-fix residuals; and verifying that the test statistic does not exceed the fault threshold.

19. The method of claim 13 wherein computing the correlation value associated with a respective satellite comprises:

computing a residual sensitivity matrix;

computing residuals corresponding to the plurality of GPS measurements; and computing a correlation coefficient associated with the respective satellite based on the residuals and the residual sensitivity matrix.

20. The method of claim 13 wherein selecting a satellite among the plurality of satellites as the satellite contributing the faulty measurement comprises:

identifying a highest correlation value; and selecting the satellite associated with the highest correlation value as the satellite contributing the faulty measurement.

21. A computer readable medium comprising computer executable program instructions that when executed by a processor in a digital processing system, causes the digital processing system to perform the operations of:

computing a plurality of correlation values, each correlation value associated with one of the plurality of GPS range measurements obtained by a GPS receiver with respect to a plurality of satellites, each of the plurality of GPS measurements corresponding to one of the plurality of satellites; and selecting the GPS range measurement associated with a highest correlation value among the plurality of correlation values as a faulty measurement.

22. The computer readable medium of claim 21 wherein the method further comprises:

determining a size of an error in the faulty measurement.

23. A computer-readable medium containing thereon instructions, which, when executed by a processor in a digital processing system, causes the digital processing system to determine a state of a discrete-time controlled process by performing the operations of:

computing a plurality of correlation values, each correlation value associated with one of a plurality of GPS range measurements obtained by a GPS receiver with respect to a plurality of satellites, each of the plurality of GPS measurements corresponding to one of the plurality of satellites; and selecting a GPS measurement among the plurality of GPS measurements as a faulty measurement based on the correlation values.

24. The computer-readable medium of claim 23 wherein the operations that the instructions cause the digital processing system to perform further comprise:

determining a size of an error in the faulty measurement.

25. The computer-readable medium of claim 24 wherein determining the size of the error in the faulty measurement comprises:

dividing a root mean square residual of the plurality of measurements by a root mean square residual corresponding to a unit change in one of the plurality of measurements while the rest of the plurality of measurements are unchanged.

26. The computer-readable medium of claim 24 wherein determining the size of the error in the faulty measurement comprises:

dividing a root mean square residual of the plurality of measurements by a square root of a diagonal element corresponding to the faulty measurement in a residual sensitivity matrix.

27. The computer readable medium of claim 23 wherein the correlation values represent a correlation between residuals of the plurality of measurements and residuals corresponding to a change in the one of the plurality of measurements while the rest of the plurality of measurements are unchanged.

28. A computer-readable medium containing thereon instructions, which, when executed by a processor in a digital processing system, causes the digital processing system to determine a state of a discrete-time controlled process by performing the operations of:
  computing a plurality of correlation values each correlation value associated with one of a plurality of measurements, the computing of the correlation values including:
    computing a residual sensitivity matrix;
    computing residuals corresponding to the plurality of measurements; and
    computing a correlation coefficient associated with the one of the plurality of measurements based on the residuals of the plurality of measurements and the residual sensitivity matrix; and
  selecting a measurement among the plurality of measurements as the faulty measurement based on the correlation values.

29. The computer-readable medium of claim 28 wherein computing the residuals corresponding to the plurality of measurements comprises:
  obtaining a least-squares solution of a state of a discrete-time controlled process;
  computing expected values of the plurality of measurements based on the least-square solution; and
  computing differences between the plurality of measurements and the expected values of the plurality of measurements.

30. The computer-readable medium of claim 28 wherein the residuals corresponding to the plurality of measurements are computed using the residual sensitivity matrix.

31. The computer-readable medium of claim 23 wherein selecting a measurement among the plurality of measurements as the faulty measurement comprises:
  identifying a highest correlation value; and
  selecting the measurement associated with the highest correlation value as the faulty measurement.

32. The computer-readable medium of claim 31, wherein selecting the measurement associated with the highest correlation value as the faulty measurement comprises:
  identifying a second highest correlation value; and
  selecting the measurement associated with the highest correlation value as the faulty measurement when the difference between the highest correlation value and the second highest correlation value exceeds a predetermined threshold value.

33. The computer-readable medium of claim 31 wherein selecting the measurement associated with the highest correlation value as the faulty measurement comprises:
  determining that the highest correlation value exceeds a first predetermined threshold value;
  identifying a second highest correlation value; and
  determining that the second highest correlation value is smaller than the first predetermined threshold value and the difference between the first predetermined threshold value and the second highest correlation value exceeds a second predetermined threshold value.

34. The computer-readable medium of claim 23 wherein the number of the plurality of satellites is greater than 5.

35. A system capable of identifying a faulty measurement among a plurality of GPS range measurements that are used to determine a state of a discrete-time controlled process, comprising:
  a processor;
  a memory including instructions, which, when executed by the processor, causes the processor to perform the operations of:
    computing a plurality of correlation values, each correlation value associated with one of the plurality of GPS measurements obtained by a GPS receiver with respect to a plurality of satellites, each of the plurality of GPS measurements corresponding to one of the plurality of satellites; and
    selecting a GPS measurement among the plurality of GPS measurements as the faulty measurement based on the correlation values.

36. The system of claim 35 wherein the correlation values represent a correlation between residuals of the plurality of measurements and residuals corresponding to a change in the one of the plurality of measurements while the rest of the plurality of measurements are unchanged.

37. A system capable of identifying a faulty measurement among a plurality of measurements that are used to determine a state of a discrete-time controlled process, comprising:
  a processor;
  a memory including instructions, which, when executed by the processor, causes the processor to perform the operations of:
    computing a plurality of correlation values, each correlation value associated with one of the plurality of measurements, the computing of the correlation values including:
      computing a residual sensitivity matrix;
      computing residuals corresponding to the plurality of measurements; and
      computing a correlation coefficient associated with the one of the plurality of measurements based on the residuals of the plurality of measurements and the residual sensitivity matrix; and
    selecting a measurement among the plurality of measurements as the faulty measurement based on the correlation values.

38. The system of claim 37 wherein computing the residuals corresponding to the plurality of measurements comprises:
  obtaining a least-squares solution of the state of the discrete-time controlled process;
  computing expected values of the plurality of measurements based on the least-square solution; and
  computing differences between the plurality of measurements and the expected values of the plurality of measurements.

39. The system of claim 37 wherein the residuals corresponding to the plurality of measurements are computed using the residual sensitivity matrix.

40. The system of claim 35 wherein selecting a measurement among the plurality of measurements as the faulty measurement comprises:
  identifying a highest correlation value; and
  selecting the measurement associated with the highest correlation value as the faulty measurement.

41. The system of claim 40, wherein selecting the measurement associated with the highest correlation value as the faulty measurement comprises:
  identifying a second highest correlation value; and
  selecting the measurement associated with the highest correlation value as the faulty measurement when the difference between the highest correlation value and the second highest correlation value exceeds a predetermined threshold value.

42. The system of claim 40 wherein selecting the measurement associated with the highest correlation value as the faulty measurement comprises:

determining that the highest correlation value exceeds a first predetermined threshold value;

identifying a second highest correlation value; and determining that the second highest correlation value is smaller than the first predetermined threshold value and the difference between the first predetermined threshold value and the second highest correlation value exceeds a second predetermined threshold value.

43. The system of claim 35 wherein the number of the plurality of satellites is greater than 5.

44. The system of claim 35, wherein the operations further comprise:

determining a size of an error in the faulty measurement.

45. The system of claim 44 wherein determining the size of the error in the faulty measurement comprises:

dividing a root mean square residual of the plurality of measurements by a root mean square residual corresponding to a unit change in one of the plurality of measurements while the rest of the plurality of measurements are unchanged.

46. The system of claim 44 wherein determining the size of the error in the faulty measurement comprises:

dividing a root mean square residual of the plurality of measurements by a square root of a diagonal element corresponding to the faulty measurement in a residual sensitivity matrix.

47. A system for identifying a faulty measurement among a plurality of GPS range measurements that are used to determine a state of a discrete-time controlled process, comprising:

means for computing a plurality of correlation values, each correlation value associated with one of the plurality of GPS measurements obtained by a GPS receiver means with respect to a plurality of satellites, each of the plurality of GPS measurements corresponding to one of the plurality of satellites; and means for selecting a GPS measurement among the plurality of GPS measurements as the faculty measurement based on the correlation values.

* * * * *